Feb. 11, 1958 L. S. MICHELS 2,823,374

CURSOR GENERATOR WITH A HEIGHT FINDING ADAPTATION

Filed Feb. 21, 1955 3 Sheets-Sheet 1

INVENTOR.
LAWRENCE MICHELS
BY
[signature]
ATTORNEY

Feb. 11, 1958 L. S. MICHELS 2,823,374

CURSOR GENERATOR WITH A HEIGHT FINDING ADAPTATION

Filed Feb. 21, 1955 3 Sheets-Sheet 2

INVENTOR.
LAWRENCE MICHELS
BY
ATTORNEY

CURSOR GENERATOR WITH A HEIGHT FINDING ADAPTATION

Filed Feb. 21, 1955 3 Sheets-Sheet 3

INVENTOR.
LAWRENCE MICHELS
BY
ATTORNEY

United States Patent Office 2,823,374

Patented Feb. 11, 1958

2,823,374

CURSOR GENERATOR WITH A HEIGHT FINDING ADAPTATION

Lawrence S. Michels, Inglewood, Calif., assignor to Gilfillan Bros. Inc., Los Angeles, Calif., a corporation of California Application February 21, 1955, Serial No. 489,359

8 Claims. (Cl. 343—11)

Figure 1:
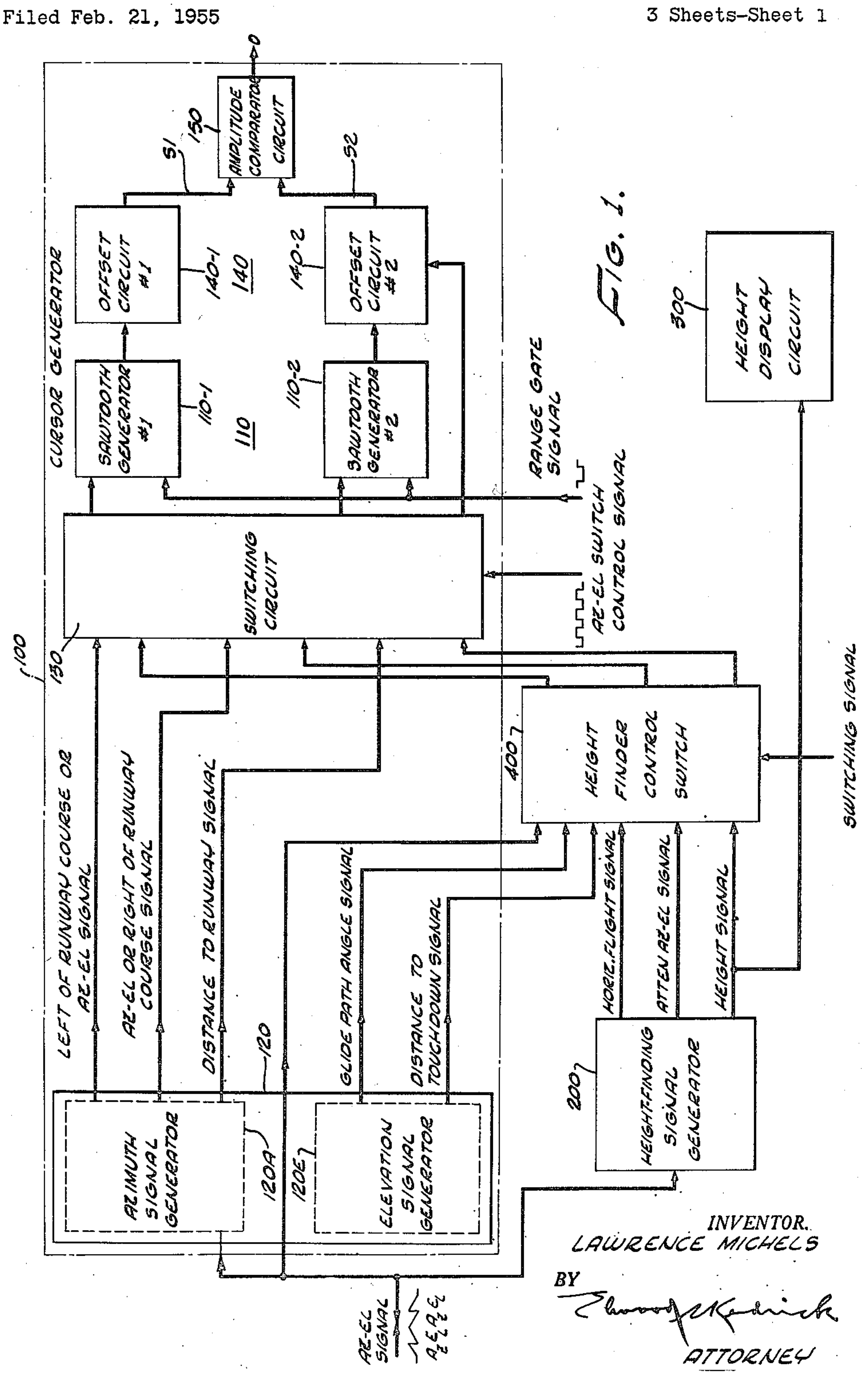

This invention relates to a cursor generator with a height finding adaptation and, more particularly, to apparatus for generating pulses representing a cursor line where the line may represent a vertically variable horizontal flight path for height finding as well as predetermined azimuth or elevation flight paths specifying an ideal ground-controlled approach landing.

Various methods and means have been previously provided for generating cursor line representing pulses; reference being made, for description thereof, to:

(1) Copending U. S. application Serial No. 222,511, for "Cursor Line and Map Generator," by David J. Green et al., filed April 23, 1951;

(2) Copending U. S. application Serial No. 266,002, now Patent No. 2,741,761, for "Means and Techniques for Producing Visible Display of Ideal Flight Path," by Dallas V. Franke, filed January 11, 1952.

(3) Copending U. S. appln. Serial No. 484,997, for "Doubly Variable Signal Comparison Method and Apparatus for Generating Pulses Representing a Cursor Line," by Lawrence Michels, filed January 31, 1955.

In each of these copending applications means is provided for simulating a cursor line in any of three situations. In one case the line may represent a glidepath in elevation. In the other cases the line exists in the azimuth plane where the scanning origin may exist either to the left or to the right of a course line specifying an ideal flight path.

The present invention provides a means for adapting a cursor generator of the type described in the above-mentioned copending applications so that it may be utilized to generate another type of cursor line representing a horizontal flight path. The horizontal flight cursor line may be varied until it appears to intersect a target. The offsetting signal which is required to provide this intersection then specifies the altitude of the target.

Essentially the height finding technique of the present invention requires only a simple adaptation of an azimuth course line generator, where effectively a rotation in space of 90° is introduced and the azimuth distance-to-runway location is translated into a distance to the horizontal flight path line, which is made variable.

The present invention therefore makes it possible to generate signals representing a variable height horizontal cursor line in a system including a cursor generator for other predetermined flight paths, the adaptation requiring a minimum of additional circuits over those previously required. In particular, the technique of the invention requires only the introduction of the following circuits in order to adapt a conventional cursor generator into a generator with a height-finding adaptation. A variable signal source is required to provide a signal representing height or altitude, where the signal range may be selected to be similar to the azimuth distance-to-runway signal range. This source may conveniently be provided by a potentiometer, voltage divider circuit.

In addition, a circuit is required to introduce a scale factor into the scan angle representing signal where the altitude variation which is possible may be considerably greater than the distance-to-runway variation existing in the azimuth plane. This scale factor may also be provided through a potentiometer voltage divider. A circuit may also be required for displaying the height signal to indicate the corresponding altitude in any convenient scale, such as feet. And, finally, a switching circuit may be required to allow the selection between elevation flight path signals, which may represent a glidepath for a ground-controlled approach landing, and the variable height horizontal line provided through the height finder adaptation.

The invention may also find utility in various applications where only a height finding signal is required, the other cursor signals not being necessary. In this situation the cursor generator circuit forms an integral part of the height finder arrangement and continuously provides pulses representing a variable height, horizontal line. Although the height finding technique requires the inclusion of a cursor generator, the total circuit arrangement nevertheless is relatively simple as compared to the typical height finding circuit available in the art. An example of a conventional prior art arrangement is found in United States Patent No. 2,693,647, for "Radar Training System," by R. O. Bolster et al., issued November 9, 1954. In the system of the Bolster patent the elevation angle is expressed as a hyperbolic function as follows:

$$\theta = K_1 \frac{\text{height}}{\text{range}}$$

This function is simulated in the height finding circuit by means of a hyperbolic circuit providing a voltage that varies hyperbolically with range. This circuit is described in Column 18 of the patent, and is shown in Fig. 16.

While the arrangement of the patent provides a satisfactory solution to the height finding problem, a circuit complexity results which is undesirable for many applications. This complexity, for example, may be undesirable in a simple ground-controlled approach system which may be utilized in small airport facilities.

The present invention obviates the necessity of utilizing a complicated set of circuits such as are required in generating a hyperbolic function and permits a linear variation in the height representing signal, with a corresponding variation in position of the horizontal line cursor, until the cursor line intersects the signal representing a target. It may be noted here that the variable height representing signal need not necessarily be displayed to indicate the corresponding altitude since a feedback control may be effected which automatically stabilizes the height signal at a value where the horizontal line intersects the signal representation of the target position.

Accordingly, it is an object of the present invention to provide a circuit for adapting a cursor generator for a height finding operation where a cursor line is represented which may designate a vertically variable horizontal flight path.

Another object is to provide a cursor generator with a height finding adaptation where the azimuth course line generator may be utilized to produce a similar line effectively rotated in space by 90°, the azimuth distance-to-runway location being effectively translated into a variable height to a horizontal flight path line.

A further object is to provide a simple height finder circuit where no complicated function generating circuits are required.

Still another object is to provide means for adapting a cursor generator to a height finding operation where a minimum of additional circuits are required.

A specific object of the invention is to provide a circuit for adapting a cursor generator for a height finding operation where only the addition of a variable height signal source, a scale factor circuit, a height signal display circuit and a switching circuit are required.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Figure 1A:
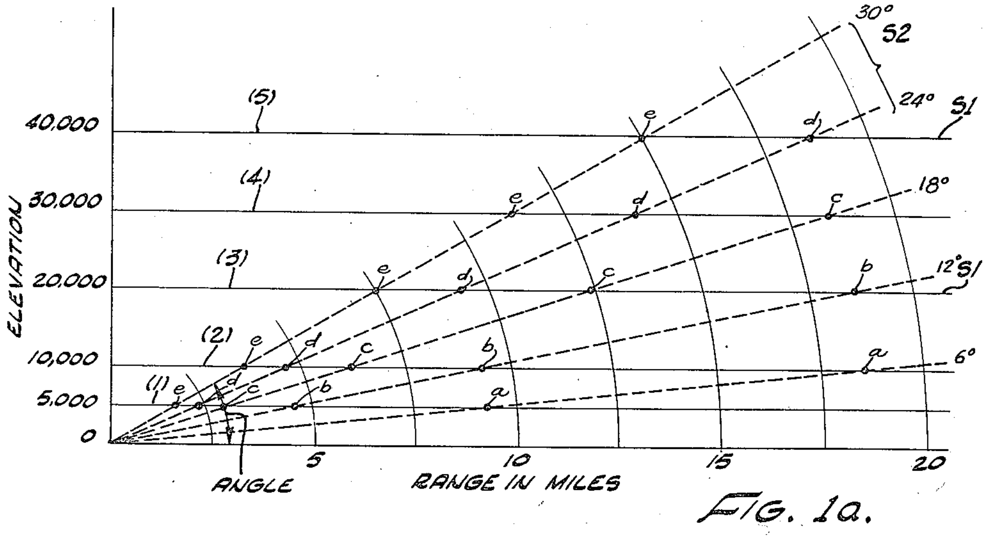
Figure 1B:
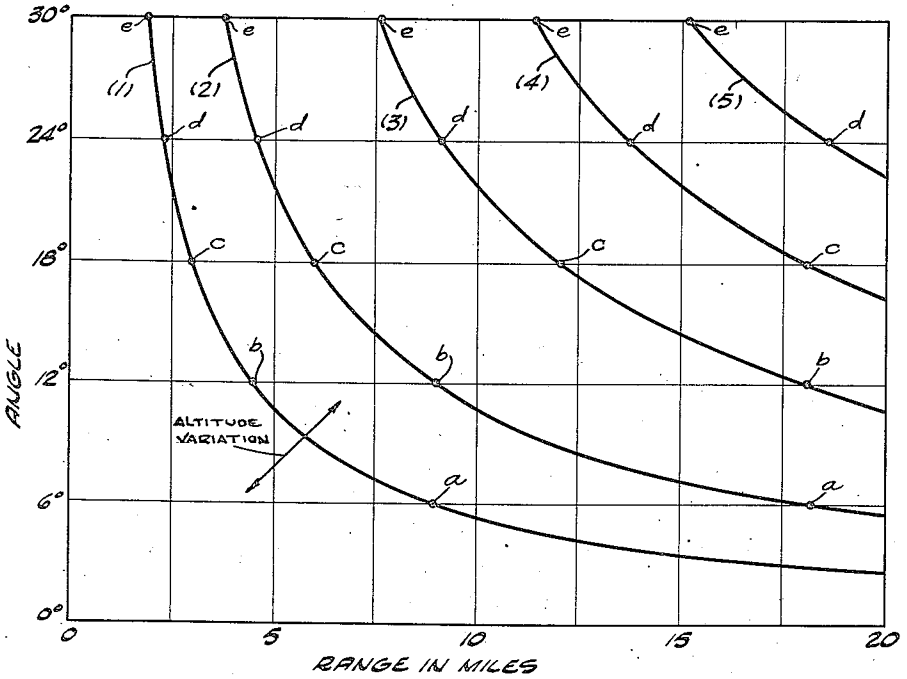
Figure 2:
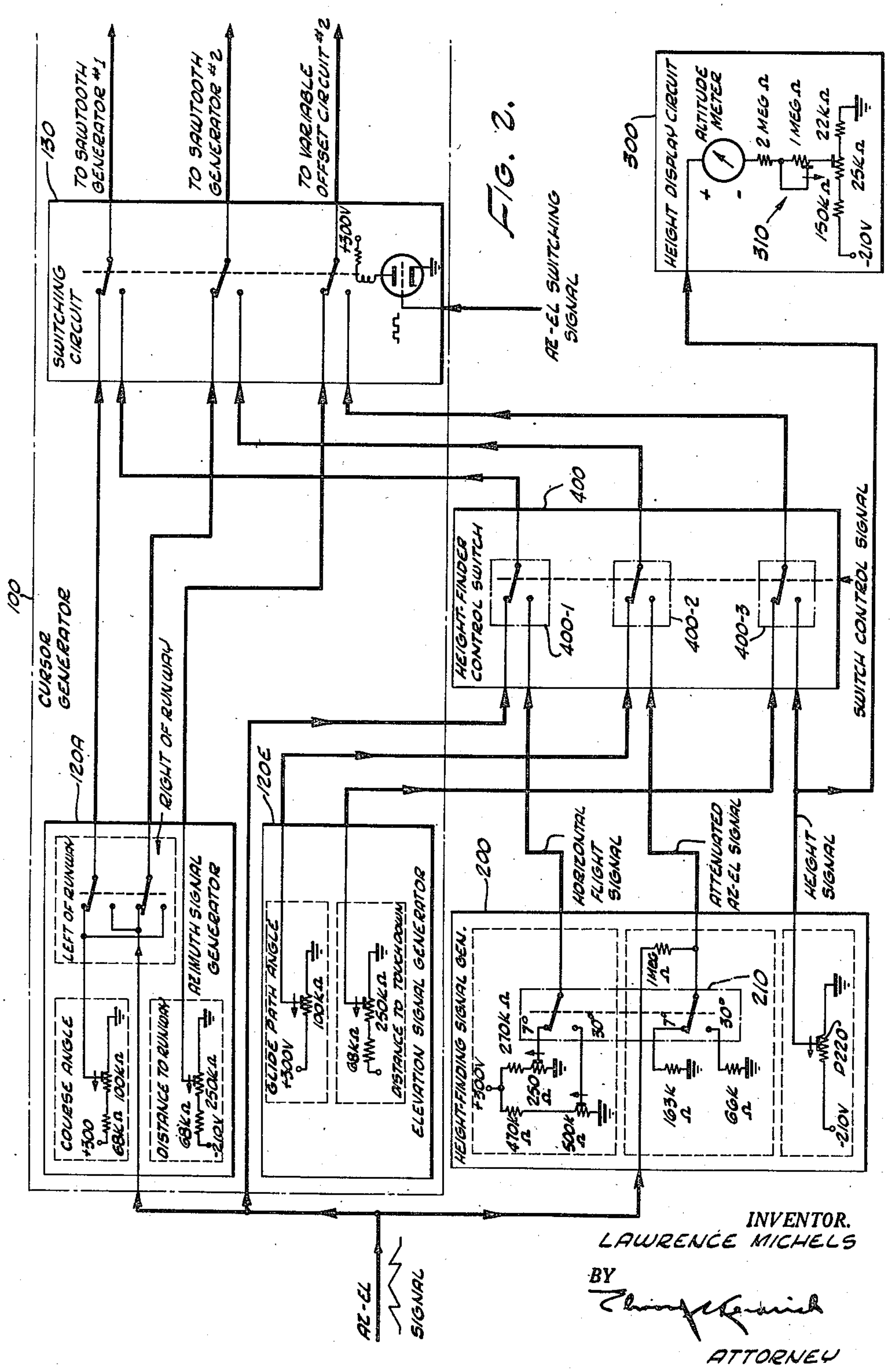

Fig. 1 is a block diagram indicating one arrangement of the invention;

Fig. 1*a* is a space diagram illustrating a typical situation where the invention may be employed;

Fig. 1*b* illustrates a typical "B" display showing a plurality of cursor lines corresponding to a plurality of horizontal flight lines which may be positioned to intersect a target representing spot; and Fig. 2 is a schematic diagram of a specific form which the embodiment of Fig. 1 may assume.

Reference is now made to Fig. 1 wherein a cursor generator with a height finding adaptation, according to the present invention, is shown in block diagram form. As indicated in Fig. 1, in a typical arrangement of the invention three major components may be included. The first is a cursor generator 100, which may be similar to one of those described in the above-mentioned copending applications by Green, Franke, and Michels; Serial No. 222,511; Serial No. 266,002, now Patent No. 2,741,761; and Serial No. 484,997, respectively. The specific arrangement of generator 100 indicated corresponds to that described and claimed in the copending application by Michels and will be further described below, although reference is made to the copending application for a complete description thereof.

In addition, the embodiment of Fig. 1 includes a height finding signal generator 200 producing a horizontal flight signal representing the angle of flight in a manner similar to the representation of a glidepath angle, as is more fully discussed below. Signal generator 200 also produces an attenuated AZ–EL signal corresponding to an applied AZ–EL signal differing in amplitude therefrom by a predetermined factor due to the difference in signal range in the normal cursor generating operation and the height finding operation, as will be explained below. Finally, generator 200 produces a height signal which is effectively the equivalent of a variable offset signal and is utilized in a manner to be described to control certain operations in cursor generator 100.

The height signal may be translated into a corresponding display through a height display circuit 300. All of the signals produced by generator 200 are routed through a height finder control switch 400 to certain switching circuits in generator 100. The theory and application of the present invention may be best presented by considering a specific situation. For this purpose then a particular arrangement of cursor generator 100 will be described, and the height finding adaptation will then be considered with reference thereto.

Referring then again to Fig. 1, it is noted that cursor generator 100 includes first and second sawtooth generators 110–1 and 110–2 which are indicated to receive certain input signals produced by a source 120; the input signals being received by circuits 110 through a switching circuit 130. Circuits 110 are actuated by range gate signals to generate the time-varying signals during corresponding periods; the amplitudes of the time-varying signals being determined by the input signals received through switching circuit 130.

The output signals produced by generators 110 are applied to an offset circuit 140 which also receives certain signals produced by source 120 and produces output signals S1 and S2 which are time-varying signals offset by an amount specified by the signals received from source 120. Signals S1 and S2 then are applied to an amplitude comparator circuit 150 which produces an output pulse each time a cross-over in amplitude occurs between time-varying signals S1 and S2.

As is more fully described in the above-mentioned copending application by Michels, cursor generator 100 may be utilized to provide pulses representing lines in either an elevation plane or an aximuth plane. In one situation an elevation glidepath line may be represented as a corresponding series of pulses occurring during respective range-gated intervals at times, after the beginning of respective intervals, representing the range of a point on the line at a particular scan angle which is varied in a track-while-scan operation. Thus in this situation source 120 may be assumed to include an elevation signal generator 120E producing a glidepath angle signal and a distance-to-touchdown signal.

The glidepath angle signal determines the amplitude of one of the time-varying signals being applied, for example, through switching circuit 130 to the amplitude control input circuit of sawtooth generator 110–2. The distance-to-touchdown signal determines the amount of offset between the signals S1 and S2 and is therefore applied to offset circuit 140; being specifically illustrated, by way of example, as applied to an offset section 140–2 therein. In this manner the glidepath line in the elevation plane is specified. In addition, a varying amplitude angle-representing signal is applied to the other sawtooth generator 110–1, during elevation scans, through switching circuit 130. The varying angle signal, designated as signal AZ–EL, is utilized for both azimuth and elevation scanning and the elevation variation thereof is used to amplitude modulate the signal produced by generator 110–2. The resulting signal then has a maximum amplitude which represents the then present value of the elevation scan angle.

In a similar manner two types of azimuth cursor lines may be represented. In one case the variable scanning angle passes through an origin point considered to be in a left-of-runway position and, in the other case, the origin point is considered to be in a right-of-runway position. In the azimuth scanning situation a signal generator 120A provides a distance-to-runway signal indicating the space between an azimuth course line and the origin point and also produces a course signal indicating the azimuth angle of the course line, the angle being measured from a convenient reference such as a line parallel to the runway.

It will be noted that generator 120A has two output leads indicated to bear the signals: left-of-runway course signal or AZ–EL signal, and AZ–EL signal or right-of-runway course signal. This designation is intended to indicate that where one output lead provides a course signal, the other output lead provides an AZ–EL signal and that these signals are reversed in changing the runway position.

Thus during azimuth scanning, in the left-of-runway position the uppermost lead of generator 120A produces the course signal and the next lead produces the AZ–EL signal; whereas in the right-of-runway position the upper lead produces the AZ–EL signal and the next lead produces the course signal. Essentially, the change from the signal representation of one runway position to the other is a double-throw, double-pole switching operation.

The space representation of the three situations discussed above is described in the above-mentioned copending application and will not be reconsidered here since this discussion is not necessary for the purpose of the present invention.

The important thing to note for present purposes is that cursor generator 100 responds to certain signals specifying the line to be represented. According to the present invention, a signal similar to the distance to runway signal utilized in the azimuth plane to specify the course line is derived through height finder control switch 400 in the form of a height signal. This height signal then may be considered to be a variable offset signal, as if the entire azimuth plane had been rotated 90° and the distance to runway had become a variable parameter.

It may be assumed for the purpose of illustration that height finder control switch 400 is normally in an unactuated position where the three uppermost signals AZ–EL, glidepath angle, and distance to touchdown, are routed to switching circuits 130. When switch 400 is actuated, however, the three uppermost signals are replaced in the same order with the horizontal flight signal, attenuated AZ–EL signal, and the height signal, respectively. Thus, instead of presenting a varying angle position representing signal to sawtooth generator #1 through switching circuits 130, as in the normal glidepath line representation, upon actuation of switch 400, sawtooth generator #1 then receives the horizontal flight signal. The horizontal flight signal then may be considered to be similar to the course angle signal which is presented to generator #1 during the representation of a course line for the left-of-runway situation.

In a similar manner the glidepath angle signal which is normally applied to generator 2 through switching circuits 130 during elevation scanning intervals is replaced by the attenuated AZ–EL signal when switch 400 is actuated. This situation then is similar to the application of the AZ–EL signal to generator #2 through switching circuits 130 during the simulation of a course line in azimuth for the left-of-runway situation.

Finally, the distance-to-touchdown signal is replaced with the variable height signal when switch 400 is actuated and passes through switching circuits 130 to offset circuit 140–2 and functions in a manner similar to the distance to runway signal in varying the base line value for sawtooth generator #2 resulting in a variation in height for the horizontal line, represented by signals which are produced by amplitude comparator circuit 150.

The manner in which the embodiment of Fig. 1 operates is illustrated in the space diagram of Fig. 1*a* and the display diagram of Fig. 1*b* in the form of a "B" display based upon rectilinear coordinates in range and elevation angle.

In referring to Fig. 1*a*, it may be noted that the dashed lines, indicated as S2, represent the variable elevation scan position of an antenna beam and the lines S1 represent horizontal lines in various possible height positions corresponding to the position of a target.

According to the height finder adaptation of the invention, then, the horizontal flight line S1 is varied in altitude in accordance with the variation of height signal applied to offset circuit #2. This offset signal then is combined with sawtooth signals S2 which are modulated by the attenuated AZ–EL signal. The combined modulated signels S2, as variably offset by the height signal, are then compared to signal S1 which represents the horizontal flight line during the height finding operation.

In operation, sawtooth signals S2 are generated at a relatively high rate corresponding to a range gated interval and cursor pulses are produced during each interval corresponding to the intersection in time of varying amplitude signal S2 and the horizontal flight line representing signal S1. To illustrate the manner in which these cursor pulses are generated, a plurality of intersection points are indicated for each of the lines S2 designated as *a*, *b*, *c*, *d*, and *e* for angles of 6°, 12°, 18°, 24°, and 30°, respectively.

A horizontal cursor line of 5,000 feet, then, appears as line (1) in Figs. 1*a* and 1*b* and intersections *a*, *b*, *c*, *d*, and *e* appear at the corresponding angle points in Fig. 1*b*. The cursor lines are shown as continuous lines in Fig. 1*b* in view of the fact that the cursor pulses are produced at a relatively high rate compared to the angle sweep and the line is substantially continuous on the cathode ray tube.

When the operator desires to determine the height of an aircraft, he adjusts the variable offset signal which produces a new cursor line, such as is illustrated by lines (2), (3), (4), and (5) in Fig. 1*b* where adjustment is made to represent flight path lines of 10,000, 20,000, 30,000, and 40,000 feet, respectively. In this manner, then, the cursor line displayed in Fig. 1*b* may be made to intersect the target and the signal amplitude of the variable offset signal, corresponding to line S1 in Fig. 1*a*, is then read and indicates the aircraft altitude.

It will be understood that the height finding adaptation may be utilized with many other types of displays such as P. P. I. sector displays or on AZ–EL type display such as is found in U. S. Patent No. 2,649,581, by H. G. Tasker et al., for "Single Scope Two-Coordinate Radar System," issued August 18, 1953, assigned to the present assignee.

A particular schematic arrangement which is suitable for practicing the invention is shown in Fig. 2 where the reference numerals utilized correspond to those of Fig. 1. The section of cursor generator 100 of Fig. 2 is similar to that described in the above-mentioned copending application by Michels except for the arrangement of switching circuits 130. These circuits are arranged in the circuit of Fig. 2 as a triple-pole, double-throw switch which is actuated in parallel in response to the AZ–EL switching signal. These switches, as all others, are shown in their unactuated position maintained during the time interval for azimuth display. Thus in the position shown in Fig. 2 all of the signals applied to sawtooth generators 110 and to variable offset circuit 140–2 are those defining the position of a course line in azimuth.

The specific circuit arrangement of azimuth signal generator 120A and elevation signal generator 120E will not be considered here since a similar arrangement is found in the application by Michels referred to above.

The present invention comes into operation when switches 130 are in the actuated position corresponding to the period for the elevation display. At this time there are two possible situations depending upon the position of height finder switch 400. When switch 400 is in its unactuated position, a glide-path line is to be represented, and consequently the AZ–EL angle signal, glidepath angle signal, and distance to touchdown signal are passed through switch sections 400–1, 400–2 and 400–3, respectively, to sawtooth generator #1, sawtooth generator #2, and variable offset circuit 140–2.

When height finder switch 400 is actuated height finding signals are introduced as follows. The horizontal flight signal passes through switch section 400–1 to sawtooth generator #1; the attenuated AZ–EL signal passes through section 400–2 to sawtooth generator #2; and a variable height signal passes through section 400–3 to variable offset circuit 140–2. The variable height signal is also applied to height display circuit 300, which is shown as including an altitude meter connected in series with a potentiometer circuit 310 providing a suitable bias signal.

As the variable signal is changed, the cursor display line of Fig. 1*b* moves in position and the reading of meter changes accordingly. Thus the operator may position the variable-height horizontal line representing marks of the display so as to intersect a target spot and then may determine the altitude of the target through the reading of the altitude meter.

The height finder signal generator is arranged to provide two sets of signals for various height ranges. A switching operation is effected to select between these signals by means of a switch 210 providing signals for a 7° elevation angle operation in its upper position and a 30° elevation angle operation in its lower position. The upper or 7° elevation scanning range allows height finding for altitudes in the range of 500 to 5000 feet and the actuated or lower position of switch 210 allows height finding in the extended range of 5000 to 50,000 feet.

Suitable circuit values for providing a typical signal representation for these altitudes are indicated in generator 200.

It will be noted that the variable height signal is obtained through a potentiometer P220 in circuit 200 and that no selection is made therein according to the range of height finding desired. The reason for this is that the required factor is introduced into the AZ–EL angle signal by varying the amplitude range thereof in accordance with the height finding range desired. In this manner the variable height signal may exist in substantially the same signal range as the distance-to-runway signal provided by generator 120A.

The circuit element values selected in circuit 200 permit the utilization of the same display device for representing azimuth course line, where the scanning situation is offset in the range of 100 to 2000 feet, as well as the various height finding ranges mentioned above.

From the foregoing description it is apparent that the present invention provides a cursor generator with a height finding adaptation which may be utilized to represent a vertically variable horizontal flight path, the position of the flight path being varied until it appears to intersect a spot representing a target whose height is to be measured, the variation of this flight path position being representable as a corresponding signal amplitude.

It should now be apparent that effectively the height finding adaptation utilizes an azimuth course line generator to produce a similar line in a plane effectively rotated in space by 90°, the arrangement thereby providing a simple means of cursor generator adaptation where no complicated function generating circuits are required.

The invention has been particularly illustrated with respect to a system where azimuth and elevation cursor lines are to be generated. It will be understood, however, that the invention may be practiced as a height finding circuit alone and provides for this purpose an efficient means of computing the height of a target without the necessity of complicated hyperbolic function generating circuits.

Reference has been made occasionally to the specific manner in which the horizontal line representing pulses are generated. It has been pointed out that the scanning angle position may be effectively offset by a variable height signal in order to allow the variation of the horizontal line until it intersects a target representing spot. However, it should be understood that the invention may be practiced as well by offsetting the horizontal line representing signal (which may be signal S1) since the important variation is one between the horizontal line and the location of the variable angle scanning position.

Furthermore, it has been indicated that a plurality of height ranges may be represented by attenuating the scan angle representing signal which effectively has the result of increasing the relative amplitude of the variable offset signal measuring height. However, this same result may be achieved without attenuating the variable angle signal by increasing the amplitude range of the height signal, such a mechanization being achieved, for example, through the utilization of another switch in generator 200. A multitude of other variations should be apparent to those skilled in the art.

I claim:

1. In a system wherein a cursor generator is utilized to produce pulses representing a cursor line, each pulse corresponding to the intersection in time between a first signal representing the cursor angle and a second variable amplitude signal representing a scan angle position, the origin of the scan angle position being offset from the cursor line by a predetermined amount represented by an offset signal; a circuit for adapting the system for utilization as a height finder comprising: first means for providing a variable height signal; second means for providing a horizontal flight signal; means for displaying the instantaneous value of said variable height signal; means for adjusting said second signal by a constant factor in accordance with the difference between the height finding range desired and the offset range possible; and means for offsetting said horizontal flight signal from said adjusted second signal by an amount proportional to said variable height signal.

2. In a system wherein a cursor line is represented by a series of pulses occurring each time equality occurs between a varying amplitude scan angle signal and a constant-value-representing cursor angle signal, the scan angle signal being offset from the cursor angle signal by an amount specified by an offset signal; a device allowing the utilization of the system to generate pulses representing a variable height horizontal cursor line, said device comprising: a variable height signal generator; switching means allowing the introduction of said variable height signal in place of said offset signal during each height-finding operation; means for presenting a cursor angle representing a horizontal line; and means for adjusting the scale factor of the variable scan angle signal so that the cursor line pulses result at respective time intervals indicating the range of a point on the variable height horizontal line where the altitude of the line is specified by the variable height signal.

3. A circuit for adapting a cursor generator so that it may provide pulses representing a variable height horizontal line, the cursor generator producing the line representing pulses upon each occurrence in time of an equality in amplitude between a first signal representing a varying scan angle line and a second signal representing the angle of the cursor line, the origin of the scan angle line being spaced from the cursor line by an amount represented by a third signal, said circuit comprising: first means for producing a variable height signal representing the distance in space between the scan angle line origin and the cursor line, and for producing a horizontal line representing signal; second means for providing a switching selection between the second signal and said horizontal line representing signal to produce a first selected output signal, and for providing a switching selection between the third signal and said variable height signal to produce a second selected output signal; and means for applying the first selected output signal to the cursor generator as a cursor line or horizontal line representing signal and for applying the second selected output signal to the cursor generator as a fixed offset signal or a variable offset signal representing the height of the horizontal line.

4. The circuit defined in claim 3 wherein said second means includes two potentiometer voltage dividers, one for providing a variable signal amplitude corresponding to said height variable signal, and the other for providing said horizontal flight signal.

5. The circuit defined in claim 3 wherein there is further included a variable height signal display device responsive to said variable height signal for providing a visual representation thereof on a convenient scale.

6. A system for determining the height of a target in space, where the target is represented by a corresponding target signal received by a ground station, said system comprising: a cursor generator for producing a series of pulses during respective range gated intervals, each pulse occurring after a time measured from the beginning of the corresponding interval representing the range, from an origin point, of the point of intersection between a varying scan angle line and a horizontal flight path line, said cursor generator including offset circuit means for receiving a signal representing the distance between the origin point and the horizontal flight path line; means for producing a variable height signal; and means for applying said variable height signal to said offset circuit means allowing a variation of the position of the corresponding horizontal flight path line until this line appears to pass through the target signal position.

7. The circuit defined in claim 6 wherein there is further included a height display circuit responsive to said variable height signal for providing a visual display thereof indicating the altitude of a variable horizontal flight path line whereby the altitude of the target may be visually noted after the variable line has been made to intersect the target signal.

8. In a system wherein an azimuth course line is represented by a series of pulses occurring during respective range-gated intervals when a varying scan angle representing signal passes through an amplitude value equal to that of a constant course angle representing signal, the course line being offset in space from the origin of the scan angle by an amount representable by an offset signal; a height-finder adaptation allowing the utilization of the system to generate pulses representing a variable height horizontal line, where effectively the course line is rotated 90° in space, said adaptation comprising: first and second signal generating devices for producing a horizontal flight signal and a variable height signal respectively representing the angle of horizontal flight relative to said course line and a variable offset between the origin point and the horizontal line; an offset circuit for receiving said variable height signal and for varying the altitude position of said horizontal flight signal; and means for indicating the altitude corresponding to the amplitude of said variable height signal, whereby the course line may be effectively varied in altitude until the cursor pulses generated therefrom appear to represent a line passing through a target having unknown altitude.

No references cited.

U. S. DEPARTMENT OF COMMERCE

PATENT OFFICE

CERTIFICATE OF CORRECTION

Patent No. 2,823,374 February 11, 1958

Lawrence S. Michels

It is hereby certified that error appears in the printed specification of the above numbered patent requiring correction and that the said Letters Patent should read as corrected below.

Column 4, line 8, for "aximuth" read --azimuth--; column 6, line 59, after "variable" insert --height--.

Signed and sealed this 1st day of April 1958.

(SEAL)
Attest:

KARL H. AXLINE
Attesting Officer

ROBERT C. WATSON
Commissioner of Patents